(12) United States Patent
Rupasinghe et al.

(10) Patent No.: US 12,413,280 B2
(45) Date of Patent: Sep. 9, 2025

(54) METHOD OF SOUNDING REFERENCE SIGNAL (SRS)-ASSISTED SD BEAM AND FD VECTOR REPORTING FOR TYPE II CHANNEL STATE INFORMATION (CSI)

(71) Applicants: NTT DOCOMO, INC., Tokyo (JP); DOCOMO Innovations, Inc.

(72) Inventors: Nadisanka Rupasinghe, Tokyo (JP); Haralabos Papadopoulos, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 398 days.

(21) Appl. No.: 17/758,952

(22) PCT Filed: Feb. 5, 2021

(86) PCT No.: PCT/US2021/016808
§ 371 (c)(1),
(2) Date: Jul. 15, 2022

(87) PCT Pub. No.: WO2021/158911
PCT Pub. Date: Aug. 12, 2021

(65) Prior Publication Data
US 2023/0052506 A1 Feb. 16, 2023

Related U.S. Application Data

(60) Provisional application No. 63/053,182, filed on Jul. 17, 2020, provisional application No. 62/971,524, filed on Feb. 7, 2020.

(51) Int. Cl.
H04B 7/06 (2006.01)
H04B 7/0456 (2017.01)
(Continued)

(52) U.S. Cl.
CPC ......... *H04B 7/0626* (2013.01); *H04B 7/0456* (2013.01); *H04B 7/0634* (2013.01);
(Continued)

(58) Field of Classification Search
CPC ... H04L 5/0094; H04L 1/0026; H04L 5/0051; H04L 1/0027; H04L 5/005; H04L 5/0023;
(Continued)

(56) References Cited

U.S. PATENT DOCUMENTS

2019/0253118 A1* 8/2019 Park ..................... H04B 7/0626
2020/0044802 A1   2/2020 Park et al.
(Continued)

FOREIGN PATENT DOCUMENTS

| JP | 2015-517258 A | 6/2015 |
|---|---|---|
| KR | 20200008595 A | 1/2020 |
| WO | 2018/199703 A1 | 11/2018 |

OTHER PUBLICATIONS

International Search Report issued in PCT/US2021/016808, mailed on Apr. 14, 2021 (4 pages).
(Continued)

*Primary Examiner* — Andrew Lee
(74) *Attorney, Agent, or Firm* — Osha Bergman Watanabe & Burton LLP

(57) ABSTRACT

A method of channel state information (CSI) reporting is disclosed that includes determining, with a user equipment (UE), whether CSI to be reported includes a matrix based on network (NW) triggering and performing, with the UE, CSI reporting based on the determination. The CSI reporting may be periodic, semi-persistent, or aperiodic CSI reporting. The matrix may be $W_{1,l}$, $W_{f,l}$, or both. The NW triggering may be explicitly performed using one or more downlink control information (DCI) bits. The NW triggering may be
(Continued)

implicitly performed based on a location of DCI detected by the UE. In other aspects, a user equipment is also disclosed.

16 Claims, 16 Drawing Sheets

(51) Int. Cl.
 *H04L 1/00* (2006.01)
 *H04L 5/00* (2006.01)
(52) U.S. Cl.
 CPC .......... *H04L 1/0026* (2013.01); *H04L 1/0027* (2013.01); *H04L 5/005* (2013.01); *H04L 5/0051* (2013.01); *H04L 5/0094* (2013.01)
(58) Field of Classification Search
 CPC . H04L 25/0224; H04B 7/0626; H04B 7/0634; H04B 7/0456
 See application file for complete search history.

(56) References Cited

U.S. PATENT DOCUMENTS

| | | | | |
|---|---|---|---|---|
| 2020/0091983 A1* | 3/2020 | Rahman | ............... | H04B 7/0417 |
| 2020/0119796 A1* | 4/2020 | Zhang | ................. | H04B 7/0456 |
| 2020/0128533 A1* | 4/2020 | Li | .......................... | H04L 1/1671 |
| 2020/0186224 A1* | 6/2020 | Ahmed Salem | ....... | H04B 7/065 |
| 2021/0028843 A1* | 1/2021 | Zhou | .................... | H04L 5/0053 |
| 2021/0067304 A1* | 3/2021 | Yokomakura | ......... | H04W 72/23 |
| 2021/0175950 A1* | 6/2021 | Sergeev | ............... | H04B 7/0456 |
| 2022/0006500 A1* | 1/2022 | Wei | ........................ | H04W 28/06 |
| 2022/0224390 A1* | 7/2022 | Ramireddy | ......... | H04L 25/0202 |
| 2022/0286261 A1* | 9/2022 | Wu | ....................... | H04B 7/0632 |
| 2022/0294508 A1* | 9/2022 | Chen | .................... | H04B 17/318 |
| 2022/0352950 A1* | 11/2022 | Faxér et al. | ......... | H04B 7/0626 |
| 2022/0353894 A1* | 11/2022 | Nogami | ................ | H04L 5/0053 |
| 2023/0023825 A1* | 1/2023 | Liu | ........................ | H04L 5/0057 |
| 2023/0097142 A1* | 3/2023 | Alfarhan | ............... | H04B 17/318 370/329 |
| 2023/0155763 A1* | 5/2023 | Hao | ...................... | H04L 5/0044 370/329 |

OTHER PUBLICATIONS

Written Opinion of the International Searching Authority issued in PCT/US2021/016808, mailed on Apr. 14, 2021 (7 pages).
Ericsson; "Summary of views on CSI reporting v4"; 3GPP TSG-RAN WG1 Meeting #94bis, R1-1812015; Chengdu, P. R. China, Oct. 6-12, 2018 (35 pages).
3GPP TS 38.214 V15.8.0; "3rd Generation Partnership Project; Technical Specification Group Radio Access Network; NR; Physical layer procedures for data (Release 15)"; Dec. 2019 (106 pages).
Office Action issued in the counterpart JP Patent Application No. 2022-547821, mailed on Aug. 29, 2023 (5 pages).
Intel Corporation; "On CSI Enhancements for MU-MIMO"; 3GPP TSG RAN WG1 #98, R1-1908652; Progue, Czech Republic, Aug. 26-30, 2019 (20 pages).

* cited by examiner e.g., if $x$ = 1 - bit,

| Bit Combination | Reporting of $W_{1,l}$ |
|---|---|
| 1 | Report $W_{1,l}$ |
| 0 | Do Not Report $W_{1,l}$ |

*FIG. 8* e.g., if $x$ = 1 - bit,

| Bit Combination | Reporting of $W_{f,l}$ |
|---|---|
| 1 | Report $W_{f,l}$ |
| 0 | Do Not Report $W_{f,l}$ |

*FIG. 11* e.g., if $x = 2$ bits,

| Bit Combination | Reporting Entities |
|---|---|
| 10 | $W_{1,l}, \widetilde{W}_l$ |
| 01 | $W_{f,l}, \widetilde{W}_l$ |
| 11 | $W_{1,l}, W_{f,l}, \widetilde{W}_l$ |

*FIG. 12* e.g., if $x$ = 2 bits,

| Bit Combination | Reporting Entities |
|---|---|
| 10 | $W_{1,l}, \tilde{W}_l$ |
| 01 | $W_{f,l}, \tilde{W}_l$ |
| 00 | $\tilde{W}_l$ |
| 11 | $W_{1,l}, W_{f,l}, \tilde{W}_l$ |

FIG. 14

METHOD OF SOUNDING REFERENCE SIGNAL (SRS)-ASSISTED SD BEAM AND FD VECTOR REPORTING FOR TYPE II CHANNEL STATE INFORMATION (CSI)

TECHNICAL FIELD

One or more embodiments disclosed herein relate to a method of sounding reference signal (SRS)-assisted SD Beam and FD Vector Reporting for Type II channel state information (CSI) in a wireless communication system.

BACKGROUND ART

In a wireless communication system, large-scale parameters (LSPs) in a wireless channel vary at a much slower rate compared to small-scale parameters (SSPs).

Angles and delays associated with a wireless channel are considered as LSPs.

Since LSPs vary much slower rate compared to SSPs, it is not required to report LSPs at the same rate as SSPs within CSI.

By making use of the sounding reference signal (SRS), information related to angle(s) and delay(s) of the channel can be estimated at the BS by utilizing DL/UL reciprocity.

Considering estimated angle(s) and delay(s), a base station (BS) can then decide and trigger when a user equipment (UE) should report associated LSPs within CSI.

Next, how reporting of angles and delays can be triggered only when it is necessary based on SRS within the Type II CSI frame work in order to reduce feedback overhead and UE complexity will be described.

Type II CSI in NR Rel. 15 will be explained below. FIG. 1 shows an example where L=2 2D-DFT vectors $b_i$ and $b_j$ are linearly combined to better represent user channel, h.

In Type II CSI in NR Rel. 15, Sub-band (SB) wise precoding vector generation for layer 1 being a subset of $\{1,2\}$ ($l \in \{1,2\}$) can be given in equation (1) as:

$$W_l(N_t \times N_3) = W_{1,l} W_{2,l}$$

In the above equation, $N_t$ represents the number of ports and $N_3$ represents the number of sub-bands.

$W_1(N_t \times 2L)$ is consists of $L \in \{2,4\}$ spatial domain (SD) 2D-DFT basis vectors. In an example of FIG. 1, $W_1(N_t \times 2L)$ may be consist of vectors $b_i$ and $b_j$.

$W_{2,l}(2L \times N_3)$ indicates SB complex linear combination (LC) coefficient matrix for layer l. In an example of FIG. 1, SB complex LC coefficients may be $c_i$ and $c_j$.

Type II CSI in NR Rel. 15 framework may be used for multi-user (MU)-MIMO. A user channel is represented by linearly combining L beams (corresponding to L 2D-DFT vectors). In Type II CSI in NR Rel. 15, Rank=1, 2 is supported.

An example where SD beam-wise channel is analyzed will be described below. FIG. 2 shows an example of SD Beam-wise frequency response of L=4 2D-DFT beams. Each row in $W_{2,l}$ matrix represents channel frequency response of a particular SD beam. Since SD beams are highly directional, associated channel taps per beam are very limited. As a result, beam-wise channel frequency response is highly correlated. In other words, LC coefficients in each row of $W_{2,l}$ are highly correlated.

Type II CSI in NR Rel. 16 will be explained below.

High correlation of LC coefficients allows to apply FD compression to $W_{2,l}$. Accordingly, SB-wise precoding vector generation for layer $l \in (1,2,3,4)$ in Rel. 16 can be given equation (2) as:

$$W_l(N_t \times N_3) = W_{1,l} \tilde{W}_l W_{f,l}^H$$

$$\tilde{W}_l W_{f,l}^H \approx W_{2,l}$$

In this equation, $\tilde{W}_l W_{f,l}^H \approx W_{2,l}$.

In this equation, $W_{f,l}$ ($N_3 \times M$) represents a matrix consisting of M DFT vectors for layer l. $\tilde{W}_l$ ($2L \times M$) represents a matrix consisting of LC coefficients for layer l.

With FD compression, the rows of $W_{2,l}$ are represented as linear combinations of $M \ll N_3$ DFT basis vectors each of size ($N_3 \times 1$).

Type II Port Selection Codebook (CB) will be described below. Type II port selection CB does not require UE to derive SD beams considering 2D-DFT basis as in regular Type II CB. Instead, the BS transmits beamformed CSI-RS and the UE has to identify best CSI-RS ports (beams) and report their indices within $W_{1,l}$.

Sub-band (SB) wise precoding vector generation for layer $l \in \{1,2,3,4\}$ can be given as:

$$W_l(N_t \times N_3) = W_1 W_{2,l}$$

$W_1$ is consists of col. vectors of an identity matrix. The vectors correspond to selected beams.

The number of CSI-RS ports are higher layer configured. For example, $P_{CS\text{-}IRS} \in \{4,8,12,16,24,32\}$.

The selected column vectors in $W_1$ correspond to selected port.

The number of ports (beams) are to be selected. For example, $L \in \{2,3,4\}$ when $P_{CSI\text{-}RR} > 4$.

The current Type II CB (both regular and port selection) requires simultaneous reporting of both $W_1$ and $W_{2,l}$ in Rel. 15 or $W_1$, $\tilde{W}_l$ and $W_{f,l}$ in Rel. 16.

Angles/Delays Associated with SD Beams/ports will be described below.

Linearly combined SD beams/ports represent l-th dominant Eigen vector of WB channel covariance matrix for l-th layer transmission. FIG. 3 shows an example of L=4 with each SD beam associated with a single cluster. FIG. 4 shows an example of Power delay profile (PDP) for the channel in FIG. 3.

Spatial information captured by SD beams/ports varies relatively slowly because SD beams/ports depend on second order channel statistics. Further, since SD beams/ports are highly directive, there will be very few scatterers associated with each SD beam. In FIG. 3, Multi-path components (MPCs) occur in clusters in the delay/angle plane, corresponding to interaction with physical clusters of scatters in the real world.

Angles/Delays Associated with SD beams will be described below.

The selected SD beams/ports are directly associated with LSP related to angles. In regular Type II CSI CB, SD beams are identified considering dominant eigen vector of wideband covariance matrix.

The selected FD vectors in Rel. 16 Type II CSI are associated with LSPs related to delays. Rows in $W_{2,l}$ matrix represent channel frequency responses of SD beams. In Rel. 16 Type II CSI, this frequency response of a SD beam is represented as a weighted sum of set of DFT beams. These DFT beams are associated with channel delay(s).

LSPs vary much slower than the SSPs.

A method of analyzing Type II CSI structure and how LSPs related to angle(s) and delay(s) are captured within Type II CSI will be described below.

Type II CSI structure from Rel. 16 can be given as:

$$W_l(N_t \times N_3) = W_{1,l} \tilde{W}_l W_{f,l}^H$$

$$\tilde{W}_l W_{f,l}^H \approx W_{2,l}$$

$W_{1,l}$ captures SD beams/ports which represent angles. $W_{f,l}^H$ captures FD vectors which represent delays.

$W_{1,l}$ in the above equation captures SD beams/ports which are associated with dominant angles of the channel. Further, in equation (2) captures FD vectors which are associated with channel delays. LC coefficients in $\tilde{W}_l$ defines how to combine SD beams/ports and FD vectors to represent instantaneous channel. As discussed above, since angles and delays are LSPs there is no need to report $W_{1,l}$ and $W_{f,l}$ at the same rate as SSPs captured in $\tilde{W}_l$.

SRS based Reciprocity for SD Beams/FD vectors reporting will be described below.

SRS transmission can be effectively utilized for deciding when to report SD beams/FD vectors In particular, information related to angle(s) and delay(s) of the channel can be estimated at the BS based on SRS by utilizing DL/UL reciprocity [2]

Considering estimated angle(s) and delay(s), BS can then decide and trigger when UE should report SD beams/FD vectors Different triggering approaches can be defined for reporting SD beams/FD vectors for different types of CSI reports, i.e., periodic, semi-persistent, and aperiodic According to the above reporting method, feedback overhead associated with CSI reporting can be further reduced. The UE complexity associated with determining SD beams/FD vectors can be reduced.

CITATION LIST

Non-Patent Reference

[Non-Patent Reference 1] 3GPP TS 38.214, "NR; Physical layer procedures for data (Release 15)"

SUMMARY OF INVENTION

One or more embodiments of the present invention provide a method of channel state information (CSI) reporting that includes determining, with a user equipment (UE), whether CSI to be reported includes a matrix based on network (NW) triggering and performing, with the UE, CSI reporting based on the determination. The CSI reporting may be periodic, semi-persistent, or aperiodic CSI reporting. The matrix may be $W_{1,l}$, $W_{f,l}$, or both. The NW triggering may be explicitly performed using one or more downlink control information (DCI) bits. The NW triggering may be implicitly performed based on a location of DCI detected by the UE.

One or more embodiments of the present invention provide a method of aperiodic channel state information (CSI) reporting that includes adding new states to a radio resource control (RRC) information element (IE) CSI-AperiodicTriggerStateList which captures whether to report a matrix. The matrix may be $W_{1,l}$, $W_{f,l}$, or both.

One or more embodiments of the present invention provide a method of aperiodic channel state information (CSI) reporting that includes adding new states to a radio resource control (RRC) information element (IE) CSI-AperiodicTriggerStateList which captures whether to report at least one of $W_{1,l}$ and $W_{f,l}$ in a joint manner.

One or more embodiments of the present invention provide a user equipment (UE), that includes a processor that determines whether CSI to be reported includes a matrix based on network (NW) triggering and a transmitter coupled to the processor that performs CSI reporting based on the determination, wherein the CSI reporting is periodic, semi-persistent, or aperiodic CSI reporting. The CSI reporting may be periodic, semi-persistent, or aperiodic CSI reporting. The matrix may be $W_{1,l}$, $W_{f,l}$, or both. The NW triggering may be explicitly performed using one or more downlink control information (DCI) bits. The NW triggering may be implicitly performed based on a location of DCI detected by the UE.

Other embodiments and advantages of the present invention will be recognized from the description and figures.

BRIEF DESCRIPTION OF THE DRAWINGS

FIG. 8 is a table that defines whether the UE reports $W_{1,l}$ according to one more embodiments.

FIG. 11 is a table that defines whether the UE reports $W_{f,l}$ according to one more embodiments.

FIG. 12 is a table that defines whether the UE reports $W_{1,l}$ and $W_{f,l}$ according to one more embodiments.

FIG. 14 is a table that defines whether the UE reports $W_{1,l}$ and $W_{f,l}$ according to one more embodiments.

DESCRIPTION OF EMBODIMENTS

Figure 1:
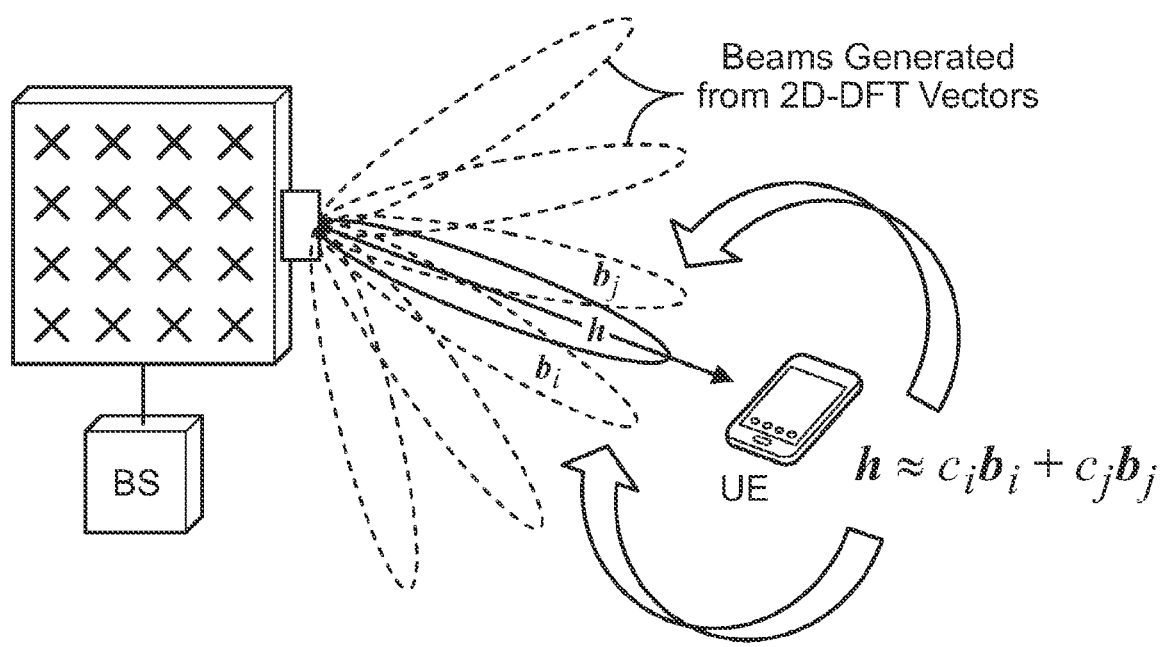
FIG. 1 shows an example where L=2 2D-DFT vectors are linearly combined to better represent user channel.
Figure 2:
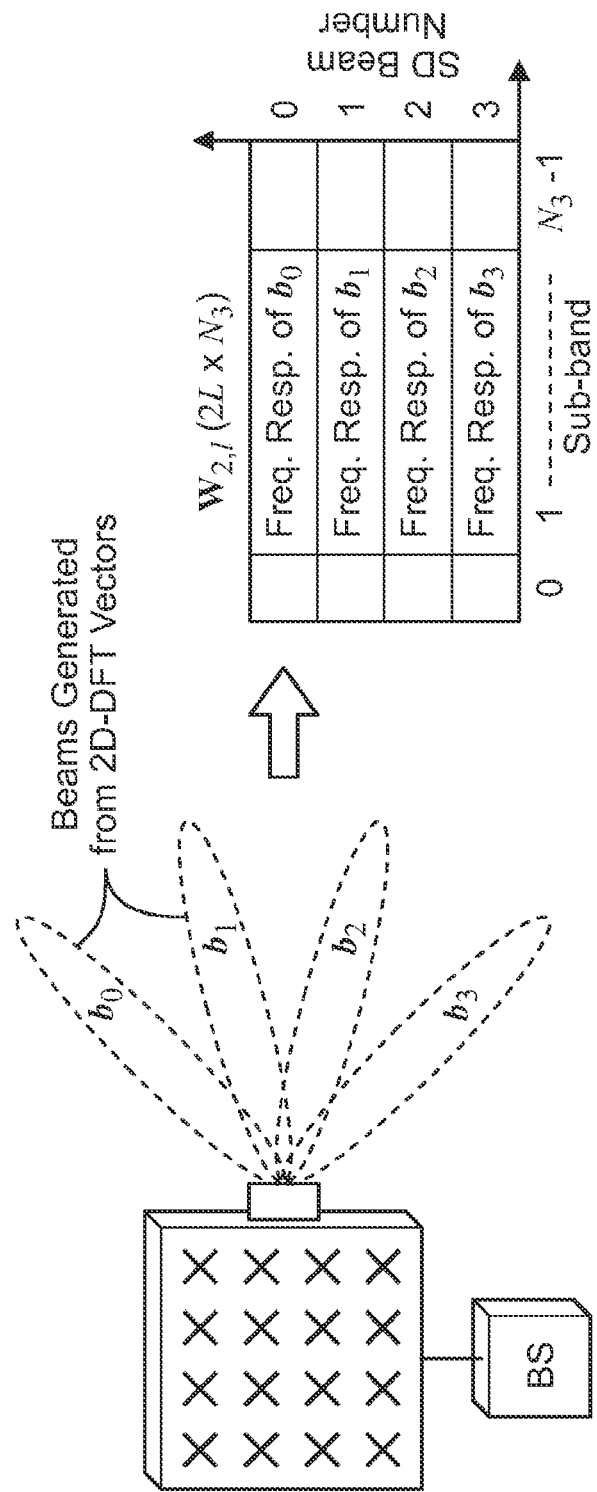
FIG. 2 shows an example of SD Beam-wise frequency response of L=4 2D-DFT beams.
Figure 3:
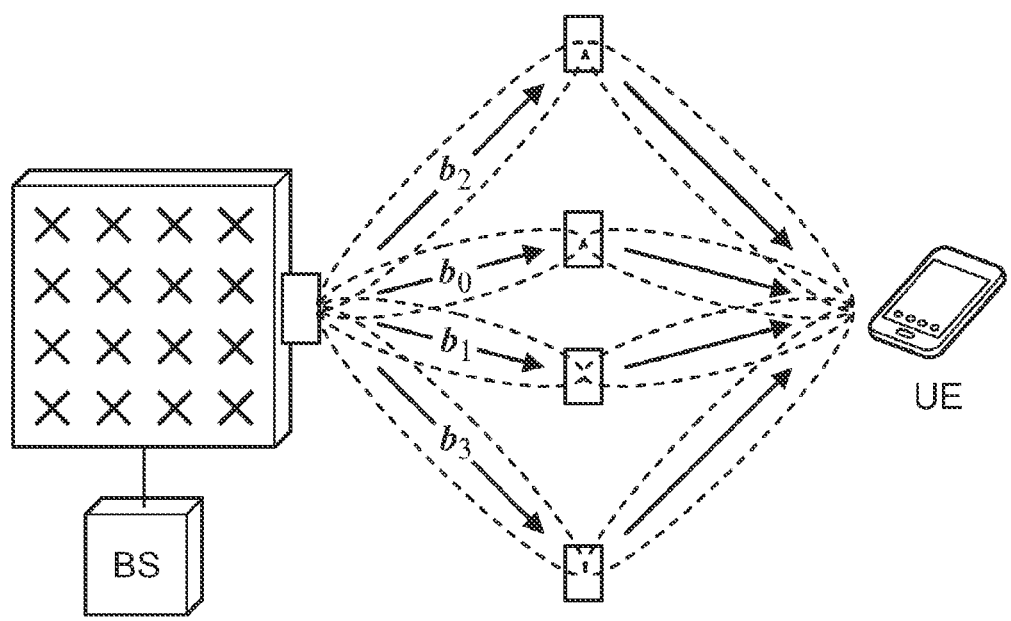
FIG. 3 shows an example of L=4 with each SD beam associated with a single cluster.
Figure 4:
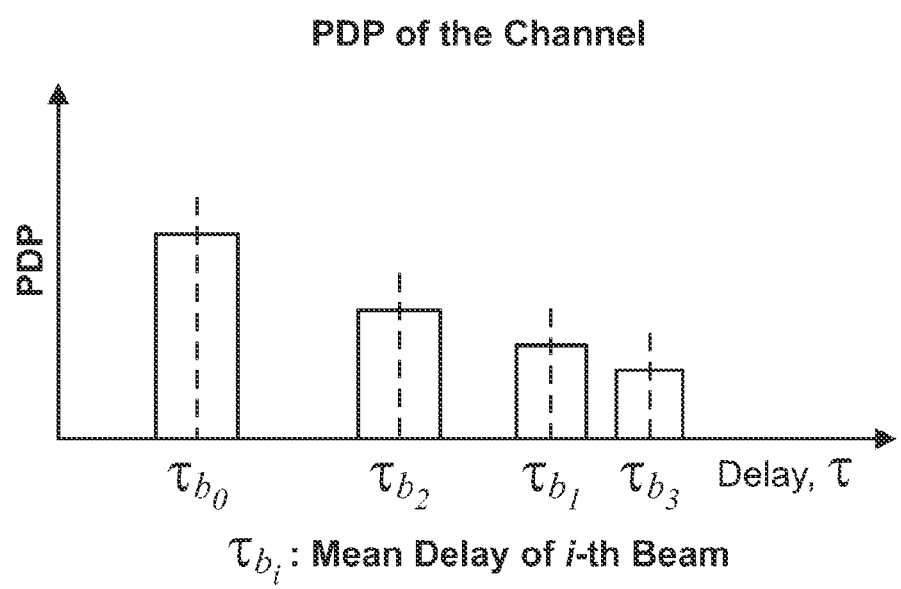
FIG. 4 shows an example of Power delay profile (PDP) tor the channel in FIG. 3.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 5:
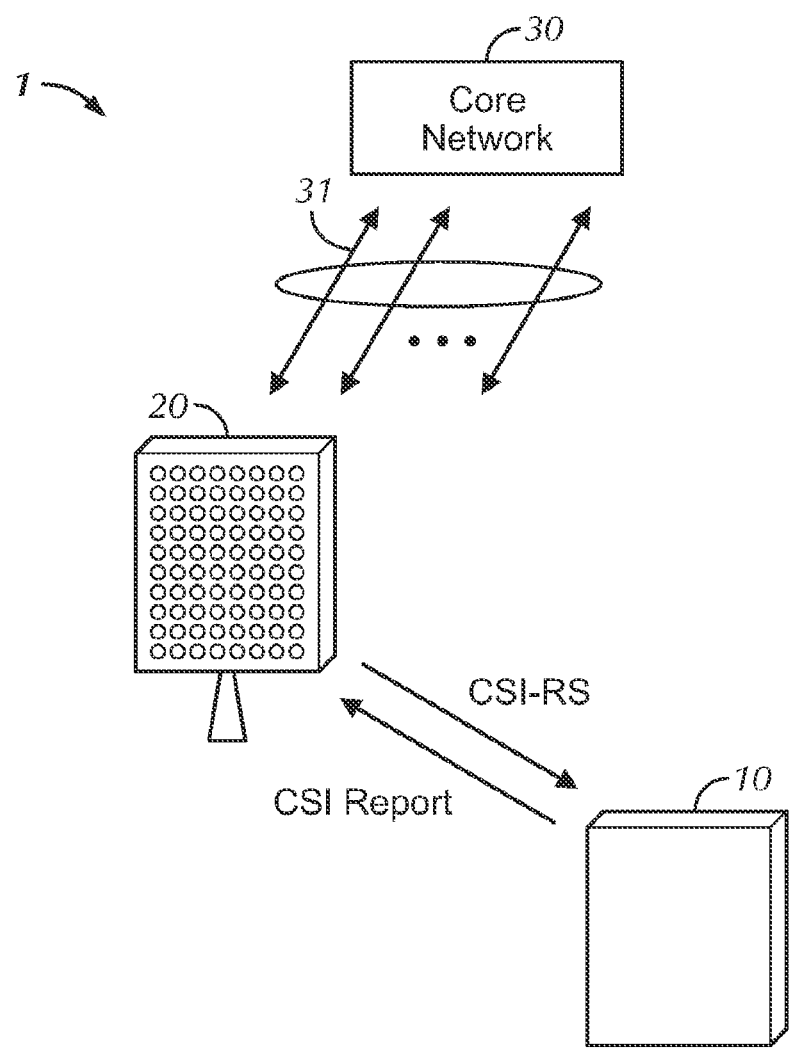
FIG. 5 shows a configuration of wireless communication system according to one or more embodiments.

FIG. 5 is a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB). The BS 20 may be referred to as a network (NW) 20.

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

As shown in FIG. 5, the BS 20 may transmit a CSI-Reference Signal (CSI-RS) to the UE 10. In response, the UE 10 may transmit a CSI report to the BS 20.

SRS-Assisted SD Beam Reporting

A method of SRS-assisted SD beam reporting according to one more embodiments will be explained below.

EXAMPLE 1

Figure 6:
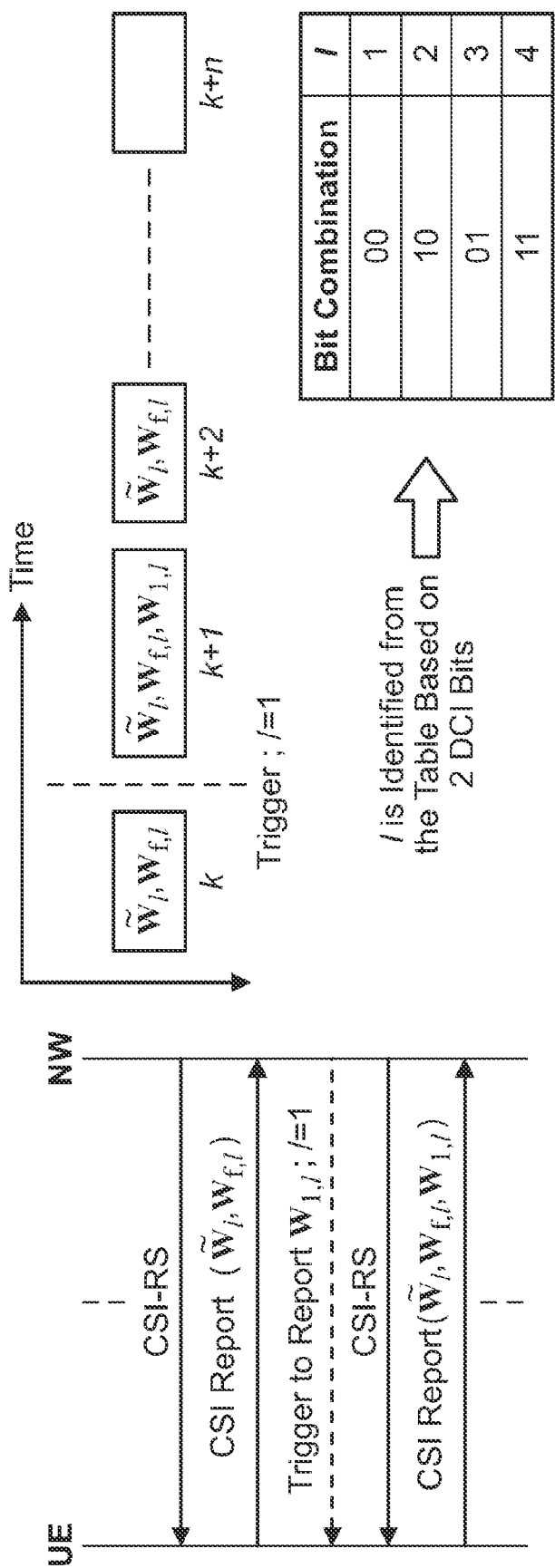
FIG. 6 is a diagram showing a method of SRS-assisted SD beam reporting according to one more embodiments.

For periodic and semi-persistent CSI reporting, using x-bit(s) in downlink control information (DCI) transmitted from the NW 20 to the UE 10, the NW 20 triggers the UE 10 to report $W_{1,l}$. If not triggered, the UE 10 transmits the periodic/semi-persistent CSI report that includes only $\tilde{W}_l$ and $W_{f,l}$. During such situations, the UE 10 may assume a previously reported $W_{1,l}$ for the calculation of $\tilde{W}_l$ and $W_{f,l}$. FIG. 6 is a diagram showing a method of SRS-assisted SD beam reporting according to one more embodiments.

For example, using x=1 bit in the DCI, the NW 20 triggers the UE 10 to report $W_{1,l}$ in the next CSI report.

For example, using x=2 bit(s) in the DCI, the NW 20 triggers the UE 10 to report $W_{1,l}$ in the upcoming $y^{th}$ CSI report.

Additionally, for the calculation of $\tilde{W}_l$ and $W_{f,l}$ using the previously reported $W_{1,l}$, the UE 10 may be configured with a timer. Alternatively, the timer may be pre-determined in one or more of the 3GPP specifications.

Before the timer is expired, the UE 10 may assume the same value for $W_{1,l}$.

After the timer is expired, the UE 10 may not assume the same value for $W_{1,l}$.

Additionally:

1) The UE 10 does not expect to be triggered for separate reporting of SSPs and LSPs.

2) If the UE 10 is triggered for separate reporting of SSPs/LSPs, the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{1,l}$ or 2) the first/last symbol of DCI to trigger the previous CSI reporting which includes $W_{1,l}$.

The above UE behavior in accordance with one or more embodiments may only be applicable when the UE 10 has reported the corresponding UE capability, for example, whether the UE 10 supports the separate triggering or whether the UE 10 supports multiple configurable "timers."

EXAMPLE 2

Figure 7:
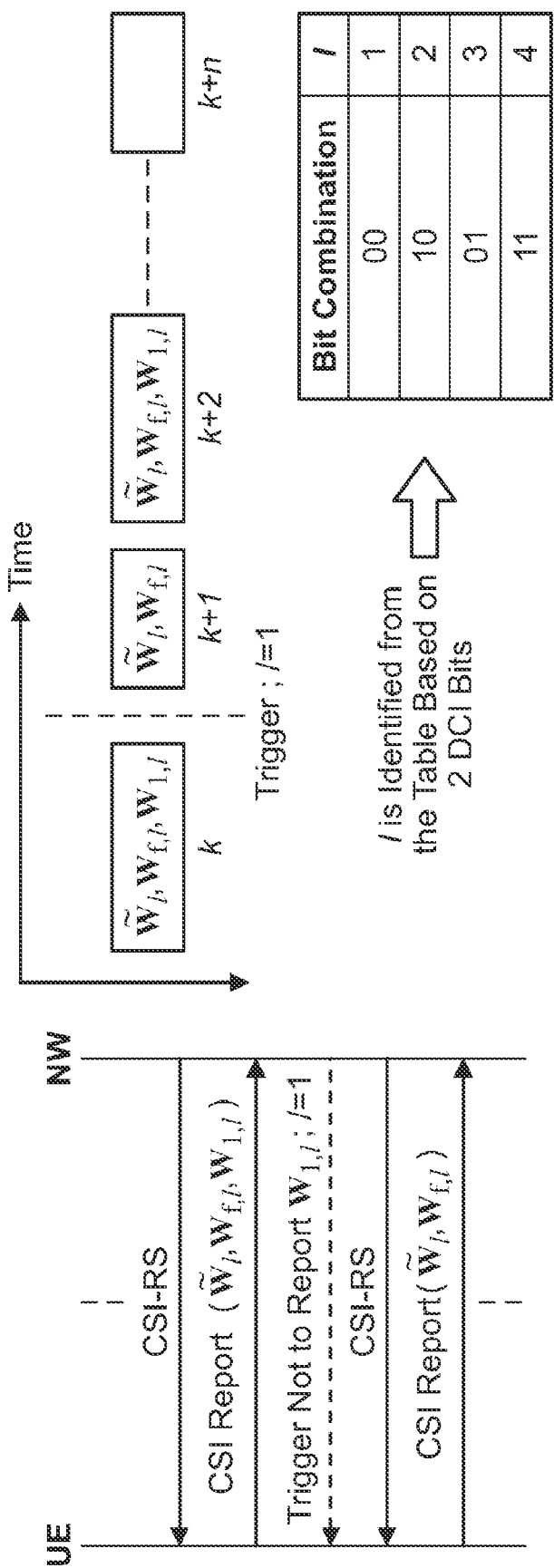
FIG. 7 is a diagram showing a method of SRS-assisted SD beam reporting according to one more embodiments.

For periodic and semi-persistent CSI reporting, using x-bit(s) in the DCI, the NW 20 triggers the UE 10 not to report $W_{1,l}$. During such situations, the UE 10 may assume a previously reported $W_{1,l}$ for the calculation of $\tilde{W}_l$ and $W_{f,l}$. If not triggered, the UE 10 transmits the periodic/semi-persistent CSI report that includes all $W_{1,l}$, $\tilde{W}_l$ and $W_{f,l}$. FIG. 7 is a diagram showing a method of SRS-assisted SD beam reporting according to one more embodiments.

For example, using x=1 bit in the DCI, the NW 20 triggers the UE 10 not to report $W_{1,l}$ in the next CSI report.

For example, using x=2 bit(s) in the DCI, the NW 20 triggers the UE 10 not to report $W_{1,l}$ in the upcoming $y^{th}$ CSI report.

For example, x-bit(s) in the DCI for Examples 1 and 2 are not limited to 1 or 2 bits. The x-bits in the DCI may be assigned any value as long as a DCI payload is acceptable. With larger x value, it is possible to configure future the CSI report further away from the current CSI report for $W_{1,l}$ reporting for Example 1/not reporting for Example 2.

Based on a location of the detected DCI in the UE 10, i.e., CCE index, RB etc. it is also possible for the UE 10 to implicitly determine information captured explicitly using x-bit(s) in the DCI for Examples 1 and 2.

EXAMPLE 3

For aperiodic CSI reporting, using additional x-bit(s) in the DCI, while triggering an aperiodic CSI report, the NW 20 configures the UE 10 whether to report $W_{1,l}$ in the CSI report. If not configured, the UE 10 includes only $\tilde{W}_l$ and $W_{f,l}$ in the aperiodic CSI report. During such situations, the UE 10 may assume a previously reported $W_{1,l}$ for the calculation of $\tilde{W}_l$ and $W_{f,l}$. For example, when x is 1-bit, if a value of the bit combination is 1, the UE 10 may report $W_{1,l}$ based on the table as shown in FIG. 8. If the value of the bit combination is 1, the UE 10 may not report $W_{1,l}$ based on the table as shown in FIG. 8.

For example, based on a location of the detected DCI in the UE 10, i.e., CCE index, RB etc. it is possible for the UE 10 to implicitly determine whether to report $W_{1,l}$ or not. Additionally, for the calculation of $\tilde{W}_l$ and $W_{f,l}$ using the previously reported $W_{1,l}$, the UE 10 may be configured with a timer. Alternatively, the timer may be pre-determined in one or more of the 3GPP specifications.

Before the timer is expired, the UE 10 may assume the same value for $W_{1,l}$.

After the timer is expired, the UE 10 may not assume the same value for $W_{1,l}$.

Additionally:

1) The UE 10 does not expect to he triggered for separate reporting of SSPs and LSPs.

2) If the UE 10 is triggered for separate reporting of SSPs/LSPs, the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{1,l}$ or 2) the first/last symbol of DCI to trigger the previous CSI reporting which includes $W_{1,l}$.

The above UE behavior in accordance with one or more embodiments may only be applicable when the UE 10 has reported the corresponding UE capability, for example, whether the UE 10 supports the separate triggering or whether the UE 10 supports multiple configurable "timers."

EXAMPLE 4

In one or more embodiments, new states may be added to CSI-AperiodicTriggerStateList in order to capture different reporting entities. Then using CSI request field in the DCI, a new state that includes necessary reporting information can be selected For example, additional reportQuantity may be added to define new CSI-ReportConfig in order to configure the UE 10 whether to report $W_{1,l}$.

For example, if reportQuantity is set to "cri-RI-PMI-CQI," precoding matrix indicator (PMI) includes $W_{1,l}$.

For example, if reportQuantity is set to "cri-RI-PMI_W1-CQI," PMI does not include $W_{1,l}$.

The above new CSI-ReportConfig may be associated with new states in CSI-AperiodicTriggerStateList.

For example, without adding additional bits to CSI request field of size. $N_{TS}$-bits in the DCI, new state selection can be handled. In such a case, if configured states are greater than $2^{N_{TS}}-1$, the UE 10 is separately configured with a selection command to map $2^{N_{TS}}-1$ code points to trigger states.

For example, additional x-bit(s) may be added to CSI request field of size $N_{TS}$-bits in the DCI, in order to select newly added states to the CSI-AperiodicTriggerStateList.

For example, a new field may be added to the aperiodic TriggerState to determine whether to report $W_{1,l}$ or not. When aperiodic TriggerState is set to "csi-Report-W1," if a value of a Boolean parameter for "csi-Report-W1" is "1", the UE 10 may report $W_{1,l}$. If the value of the Boolean parameter is "0", the UE 10 may not report $W_{1,l}$.

The new states with different values for "csi-Report-W1" can then be included in CSI-AperiodicTriggerStateList.

SRS-Assisted FD Vector Reporting

A method of SRS-assisted FD vector reporting according to one or more embodiments will be described below.

EXAMPLE 5

Figure 9:
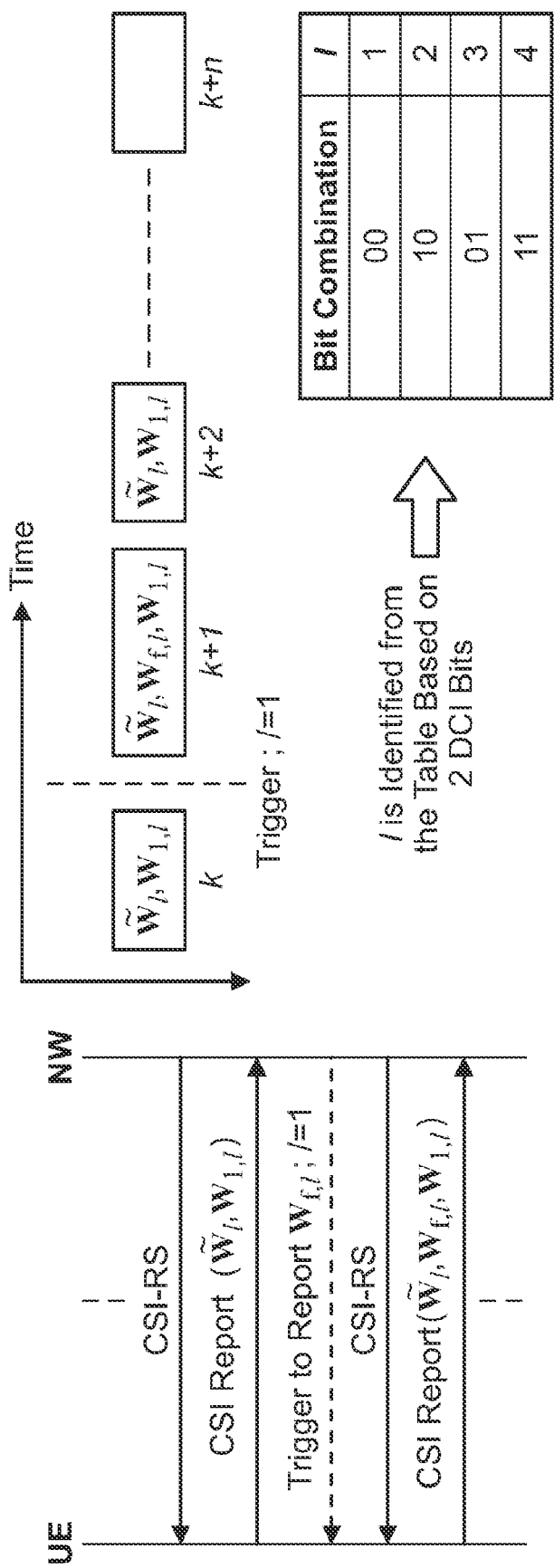
FIG. 9 is a diagram showing a method of SRS-assisted FD vector reporting according to one or more embodiments.

In one or more embodiments, for periodic acid semi-persistent CSI reporting, using y-bit(s) in the DCI, the NW 20 triggers the UE 10 to report $W_{f,l}$. If not triggered, the UE 10 transmits the periodic/semi-persistent CSI report that includes only $\tilde{W}_l$ and $W_{1,l}$. During such situations, the UE 10 may assume a previously reported $W_{f,l}$ for the calculation of $\tilde{W}_l$ and $W_{1,l}$. FIG. 9 is a diagram showing a method of SRS-assisted FD vector reporting according to one or more embodiments.

For example, using x=1 bit in the DCI, the NW 20 triggers the UE 10 to report $W_{f,l}$ in the next CSI report.

For example, using x=2 bit(s) in the DCI, the NW 20 triggers the UE 10 to report $W_{f,l}$ in the upcoming $m^{th}$ CSI report.

Additionally, for the calculation of $\tilde{W}_l$ and $W_{f,l}$ using the previously reported $W_{f,l}$ the UE 10 may be configured with a timer. Alternatively, the timer may be pre-determined in one or more of the 3GPP specifications.

Before the timer is expired, the UE 10 may assume the same value for $W_{f,l}$.

After the timer is expired, the UE 10 may not assume the same value for $W_{f,l}$.

Additionally:

1) The UE 10 does not expect to be triggered for separate reporting of SSPs and LSPs.

2) If the UE 10 is triggered for separate reporting of SSPs/LSPs, the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{f,l}$ or 2) the first/last symbol of DCI to trigger the previous CSI reporting which includes $W_{f,l}$.

The above UE behavior in accordance with one or more embodiments may only be applicable when the UE 10 has reported the corresponding UE capability, for example, whether the UE 10 supports the separate triggering or whether the UE 10 supports multiple configurable "timers."

EXAMPLE 6

Figure 10:
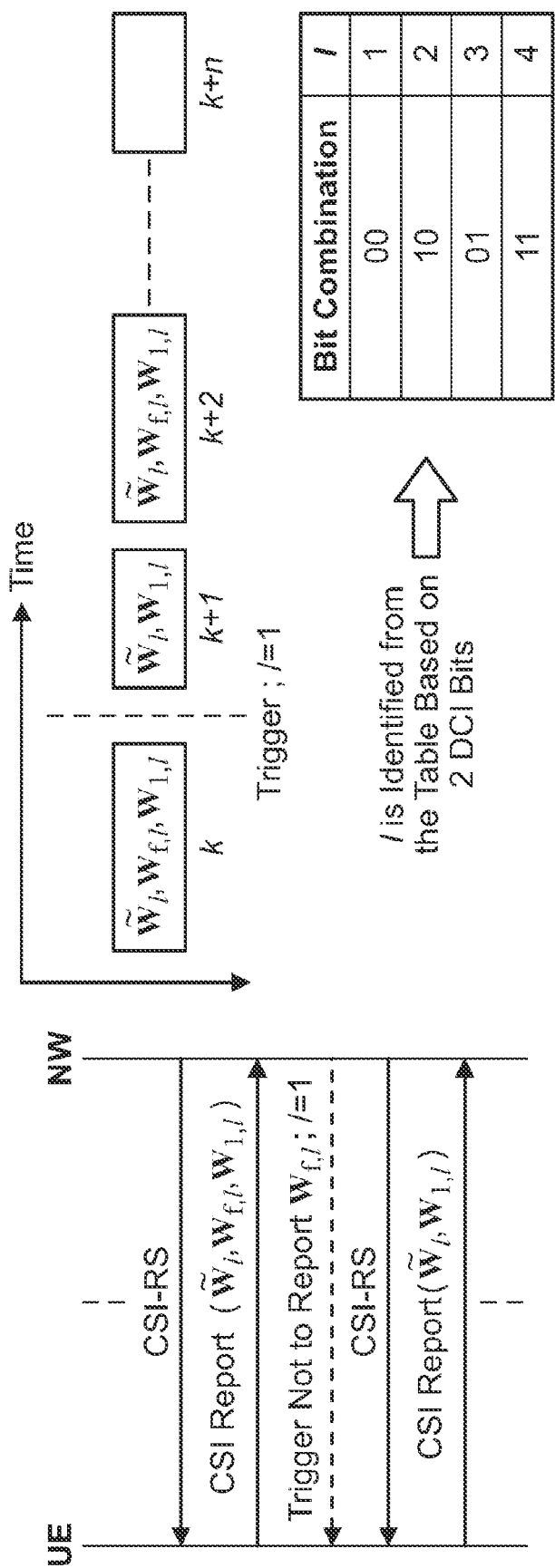
FIG. 10 is a diagram showing a method of SRS-assisted FD vector reporting according to one or more embodiments.

In one or more embodiments, for periodic and semi-persistent CSI reporting, using x-bit(s) in the DCI, the NW 20 triggers the UE 10 not to report $W_{f,l}$. During such situations, the UE 10 may assume a previously reported $W_{f,l}$ for the calculation of $\tilde{W}_l$ and $W_{1,l}$. If not triggered, the UE 10 transmits the periodic/semi-persistent CSI report that includes all $W_{1,l}$, $\tilde{W}_l$ and $W_{f,l}$. FIG. 10 is a diagram showing a method of SRS-assisted FD vector reporting according to one or more embodiments.

For example, using x=1 bit in the DCI, the NW 20 triggers the UE 10 not to report $W_{f,l}$ in the next CSI report For example, using x=2 bit(s) in the DCI, the NW 20 triggers the UE 10 not to report $W_{f,l}$ in the upcoming $y^{th}$ CSI report.

x-bit(s) in the DCI for Examples 5 and 6 are not limited to 1 or 2 bits. x-bit(s) in the DCI for Examples 5 and 6 may be assigned any value as long as a DCI payload is acceptable.

With larger x value, it is possible to configure future CSI report further away from current CSI report for $W_{f,l}$ reporting for Example 5/not reporting for Example 6.

Based on a location of the detected DCI in the UE 10, i.e., CCE index, RB etc. it is also possible for the UE 10 to implicitly determine information captured explicitly using x-bit(s) in the DCI for Examples 5 and 6.

EXAMPLE 7

In one or more embodiments, for aperiodic CSI reporting, using additional x-bit(s) in the DCI, while triggering an aperiodic CSI report, the NW 20 configures the UE 10 whether to report $W_{f,l}$ in the CSI report. If not configures, the UE 10 includes only $\tilde{W}_l$ and $W_{1,l}$ in the aperiodic CSI report. During such situations, the UE 10 may assume a previously reported $W_{f,l}$ for the calculation of $\tilde{W}_l$ and $W_{1,l}$. For example, when x is 1-bit, a value of the bit combination is 1, the UE 10 may report based on the table as shown in FIG. 11. If the value of the bit combination is 1, the UE 10 may not report $W_{f,l}$ based on the table as shown in FIG. 11.

For example, based on a location of the detected DCI in the UE 10, i.e., CCE index, RB etc. it is also possible for the UE 10 to implicitly determine whether to report $W_{f,l}$ or not.

Additionally, for the calculation of $\tilde{W}_l$ and $W_{f,l}$ using the previously reported $W_{f,l}$ the UE 10 may be configured with a timer. Alternatively, the timer may be pre-determined in one or more of the 3GPP specifications.

Before the timer is expired, the UE 10 may assume the same value for $W_{f,l}$.

After the timer is expired, the UE 10 may not assume the same value for $W_{f,l}$.

Additionally:

1) The UE 10 does not expect to be triggered for separate reporting of SSPs and LSPs.

2) If the UE 10 is triggered for separate reporting of SSPs/LSPs, the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{f,l}$ or 2) the first/last symbol of DCI to trigger the previous CSI reporting which includes $W_{f,l}$.

The above UE behavior in accordance with one or more embodiments may only be applicable when the UE 10 has reported the corresponding UE capability, for example, whether be UE 10 supports the separate triggering or whether the UE 10 supports multiple configurable "timers."

EXAMPLE 8

For example, new states may be added to CSI-AperiodicTriggerStateList in order to capture different reporting entities. Then using CSI request field in the DCI, new state that includes necessary reporting information can be selected For example, additional reportQuantity may be added to define new CSI-ReportConfig in order to configure the UE 10 whether to report $W_{f,l}$.

For example, if reportQuantity is set to "cri-RI-PMI-CQI," PMI includes $W_{f,l}$.

For example, if reportQuantity is set to "cri-RI-PMI_Wf-CQI," PMI does not include $W_{f,l}$.

The above new CSI-ReportConfig may be associated with new states in CSI-AperiodicTriggerStateList.

For example, without adding additional bits to CSI request field of size $N_{TS}$-bits in the DCI, new state selection can be handled. In that case, if configured states are greater than $2^{N_{TS}}-1$, the UE 10 is separately configured with a selection command to map $2^{N_{TS}}-1$ code points to trigger states.

For example, additional x-bit(s) may be added to CSI request field size $N_{TS}$-bits in the DCI, in order to select newly added states to the CSI-AperiodicTriggerStateList.

For example, a new field may be added to the aperiodic TriggerState to determine whether to report $W_{f,l}$ or not. When aperiodic TriggerState is set to "csi-Report-Wf," if a value of a Boolean parameter for "csi-Report-Wf" is "1", the UE 10 may report $W_{f,l}$. If the value of the Boolean parameter is "0", the UE 10 may not report $W_{f,l}$.

The above new states with different values for csi-Report-Wf can then be included in CSI-AperiodicTriggerStateList.

SRS-Assisted Joint SD Beam and FD Vector Reporting

A method of SRS-assisted joint SD Beam and FD vector reporting will be described below. Since both angle(s) and delay(s) are LSPs, it is possible to jointly trigger SD beams and FD vectors for reporting.

EXAMPLE 9

In one or more embodiments, for periodic and semi-persistent CSI reporting, using x-bit(s) in the DCI, the NW 20 triggers the UE 10 to report/not report $W_{f,l}$ and/or $W_{1,l}$. If not triggered, the UE 10 reports only $\tilde{W}_l$. If $W_{f,l}$ and/or $W_{1,l}$ are not reported, the UE 10 may assume previously reported $W_{f,l}$ and/or $W_{1,l}$ for calculating $\tilde{W}_l$ and $W_{1,l}/W_{f,l}$.

For example, when x is 2 bits, if a value of the bit combination is "10", the UE 10 may report $W_{1,l}$, $\tilde{W}_l$ based on the table as shown in FIG. 12. If the value of the bit combination is "01," the UE 10 may report $W_{f,l}$, $\tilde{W}_l$ based on the table as shown in FIG. 12. If the value of the bit combination is "11," the UE 10 may report $W_{1,l}, W_{f,l}, \tilde{W}_l$ based on the table as shown in FIG. 12.

Based on a location of the detected DCI in the UE 10, i.e., CCE index, RB etc. it is possible for the UE 10 to implicitly determine information captured explicitly using x-bit(s) in the DCI.

Additionally, for the calculation of $\tilde{W}_l$ and $W_{1,l}/W_{f,l}$ using the previously reported $W_{1,l}$ and/or $W_{f,l}$ the UE 10 may be configured with a timer. Alternatively, the timer may be pre-determined in one or more of the 3GPP specifications.

Before the timer is expired, the UE 10 may assume the same value for $W_{1,l}$ and/or $W_{f,l}$.

After the timer is expired, the UE 10 may not assume the same value for $W_{1,l}$ and/or $W_{f,l}$. Additionally:

1) The UE 10 does not expect to be triggered for separate reporting of SSPs and LSPs.

2) If the UE 10 is triggered for separate reporting of SSPs/LSPs the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{1,l}$ and/or $W_{f,l}$ or 2) the first/last symbol of DCI to trigger the previous CSI reporting which includes $W_{1,l}$ and/or $W_{f,l}$.

The above UE behavior in accordance with one or more embodiments may only be applicable when the UE 10 has reported the corresponding UE capability, for example, whether the UE 10 supports the separate triggering or whether the UE 10 supports multiple configurable "timers."

EXAMPLE 10

Figure 13:
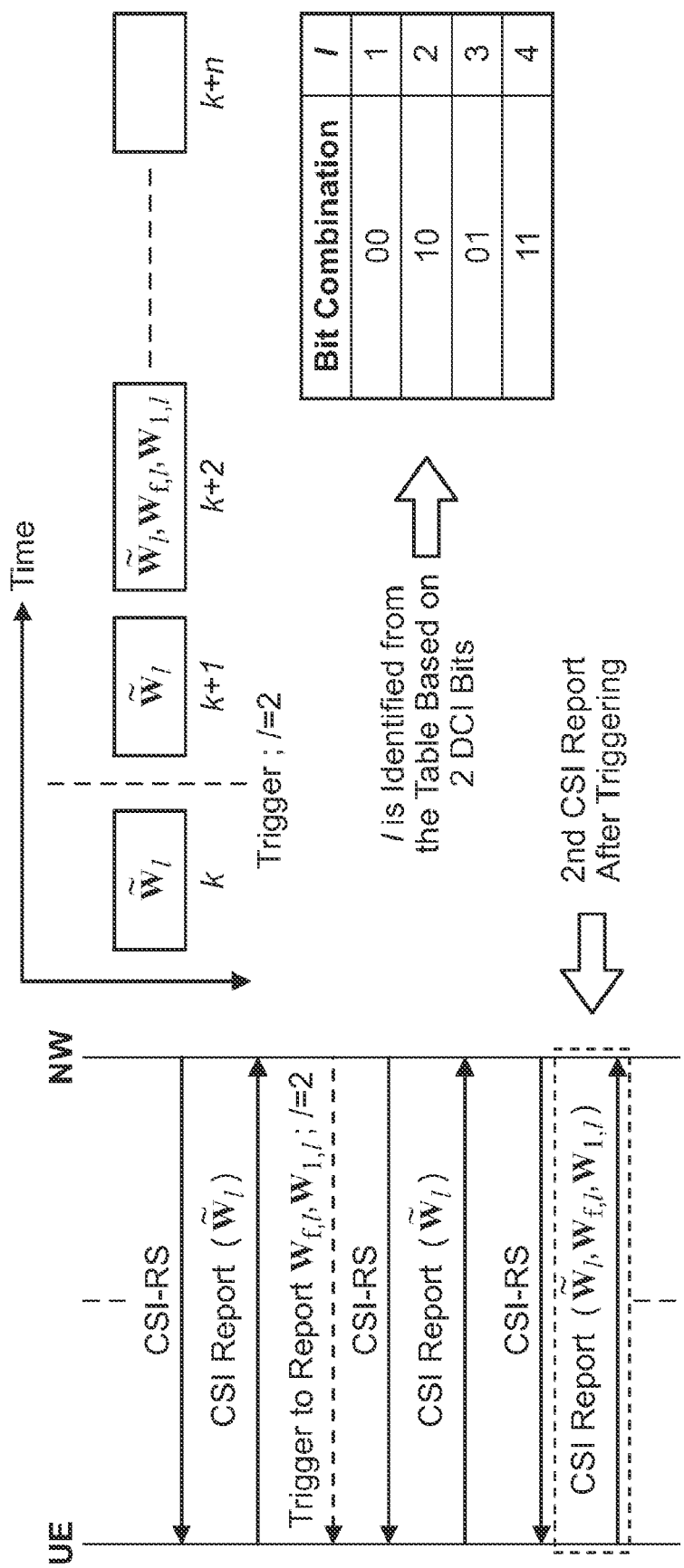
FIG. 13 is a diagram showing a method of SRS-assisted joint SD Beam and FD vector reporting according to one or more embodiments.

In one or more embodiments, using additional y-bit(s) in the DCI, the NW 20 may inform the UE 10 when to report at least one of $W_{1,l}$ and $W_{f,l}$. FIG. 13 is a diagram showing a method of SRS-assisted joint SD Beam and FD vector reporting according to one or more embodiments.

For example, if y=2 bits, and the UE 10 is triggered to report (using x=2 bits) $W_{1,l}$, $W_{f,l}$, $\tilde{W}_l$ in the second upcoming report.

EXAMPLE 11

In one or more embodiments, for aperiodic CSI reporting, using additional x-bit(s) in the DCI, while triggering an aperiodic CSI report, the NW 20 configures the UE 10 whether to report/not report $W_{f,l}$ and/or $W_{1,l}$, in the CSI report. If the UE 10 is not configured to report $W_{f,l}$ and/or $W_{1,l}$, the UE 10 may assume previously reported $W_{f,l}$ and/or $W_{1,l}$ for calculating $\tilde{W}_l$ and $W_{1,l}/W_{f,l}$.

For example, when x is 2 bits, if a value of the bit combination is "01", the UE 10 may report $W_{1,l}$, $\tilde{W}_l$ based on the table as shown in FIG. 14. If the value of the bit combination is "10", the UE 10 may report $W_{f,l}$, $\tilde{W}_l$ based on the table as shown in FIG. 14. If the value of the bit combination is "00," the UE 10 may report $\tilde{W}_l$ based on the table as shown in FIG. 14. If the value of the bit combination is "11," the UE 10 may report $W_{1,l}, W_{f,l}$, $\tilde{W}_l$ based on the table as shown in FIG. 14.

For example, based on a location of the detected DCI in the UE 10, i.e., CCE index, RB etc. it is also possible for the UE 10 to implicitly determine whether to report/not report $W_{f,l}$ and/or $W_{1,l}$, in the CSI report.

Additionally, for the calculation of $\tilde{W}_l$ and $W_{1,l}/W_{f,l}$ using the previously reported $W_{1,l}$ and/or $W_{f,l}$ the UE 10 may be configured with a timer. Alternatively, the timer may be pre-determined in one or more of the 3GPP specifications.

Before the timer is expired, the UE 10 may assume the same value for $W_{1,l}$ and/or $W_{f,l}$.

After the timer is expired, the UE 10 may not assume the same value for $W_{1,l}$ and/or $W_{f,l}$. Additionally:

1) The UE 10 does not expect to be triggered for separate reporting of SSPs and LSPs.

2) If the UE 10 is triggered for separate reporting of SSPs/LSPs, the UE 10 reports both LSP/SSP. This behavior is similar as that of Releases 15-16.

The timer may be determined and/or configured with unit of x ms/symbol/slot/sub-slot/frame/sub-frame.

Further, the timer starts at:

1) the first/last symbol of transmission of the previous CSI reporting, which includes $W_{1,l}$ and/or $W_{f,l}$ or 2) the first/last symbol of DCI to trigger the previous CSI reporting which includes $W_{1,l}$ and/or $W_{f,l}$.

The above UE behavior in accordance with one or more embodiments may only be applicable when the UE 10 has reported the corresponding UE capability, for example, whether the UE 10 supports the separate triggering or whether the UE 10 supports multiple configurable "timers."

EXAMPLE 12

In one or more embodiments, new states may be added to CSI-AperiodicTriggerStateList in order to capture different reporting entities. Then using CSI request field in the DCI, new state which includes necessary reporting information can he selected For example, additional reportQuantity may be added to define new CSI-ReportConfig in order to configure the UE 10 whether to report $W_{f,l}$ and $W_{1,l}$ The above new CSI-ReportConfig may be associated with new states in CSI-AperiodicTriggerStateList For example, if reportQuantity is set to "cri-RI-PMI-CQI," PMI includes $W_{f,l}$ and $W_{1,l}$.

For example, if reportQuantity is set to "cri-RI-PMI_Wf-CQI," PMI does not include $W_{f,l}$.

For example, if reportQuantity is set to "cri-RI-PMI_W1-CQI," PMI does not include $W_{1,l}$.

For example, without adding additional bits to CSI request field of size $N_{TS}$-bits in the DCI, new state selection can be handled. In that case, if configured states are greater than $2^{N_{TS}}-1$, the UE 10 is separately configured with a selection command to map $2^{N_{TS}}-1$ code points to trigger states.

For example, additional x-bit(s) may be added to CSI request field size $N_{TS}$-bits in the DCI, in order to select newly added states to the CSI-AperiodicTriggerStateList For example, when cri-RI-PMI_Wf-CQI is configured as reportQuantity, whether to report/not report $W_{1,l}$ may be configured using x-bit(s) in the DCI. When x is 1 bit, if a value of the x-bit is "1", the UE 10 may report $W_{1,l}$. If the value of the x-bit is "0", the UE 10 may not report $W_{1,l}$.

For example, when cri-RI-PMI_W1-CQI is configured as reportQuantity, whether to report/not report $W_{f,l}$ can be configured using x-bit(s) in the DCI. When x is 1 bit, if a value of the x-bit is "1", the UE 10 may report $W_{f,l}$. If the value of the x-bit is "0", the UE 10 may not report $W_{f,l}$.

Based on a location of the detected DCI, i.e., CCE, index, RB etc. it is also possible for the UE 10 to implicitly determine information captured explicitly using x-bit(s) in the DCI for the above examples.

Conditions on Applying SRS-Assisted SD Beam/FD Vector Reporting

According to one or more embodiments, SRS-assisted SD beam/FD vector reporting may be performed when predetermined conditions are satisfied only. The predetermined conditions may be listed as follows:

the UE 10, during its capability signaling, informs the NW 20 whether it can support SRS-assisted SD beam/FD vector reporting; and the UE 10 is configured with higher layer signaling for SRS-assisted SD beam/FD vector reporting.

If the above conditions are not met, Rel. 15/16, CSI reporting behavior is assumes, i.e. simultaneous reporting of both $W_1$ and $W_{2,l}$ in Rel. 15 or $W_1$, $\tilde{W}_l$ and $W_{f,l}$ in Rel. 16, and/or DCI size of Rel.15/16.

The UE 10 may be configured with SRS-assisted SD beam/FD vector reporting only when the UE 10 is configured with SRS resource(s). The SRS resource may be for example any SRS or SRS with no specific usage, e.g., any SRS except using for beam management purposes.

Rel.15/1.6 NW 20 does not require to configure SRS resource (it depends on gNB implementation), but one or more embodiments require SRS transmission.

Configuration of BS

The BS 20 according to embodiments of the present invention will be described below with reference to FIG. 15.

Figure 15:
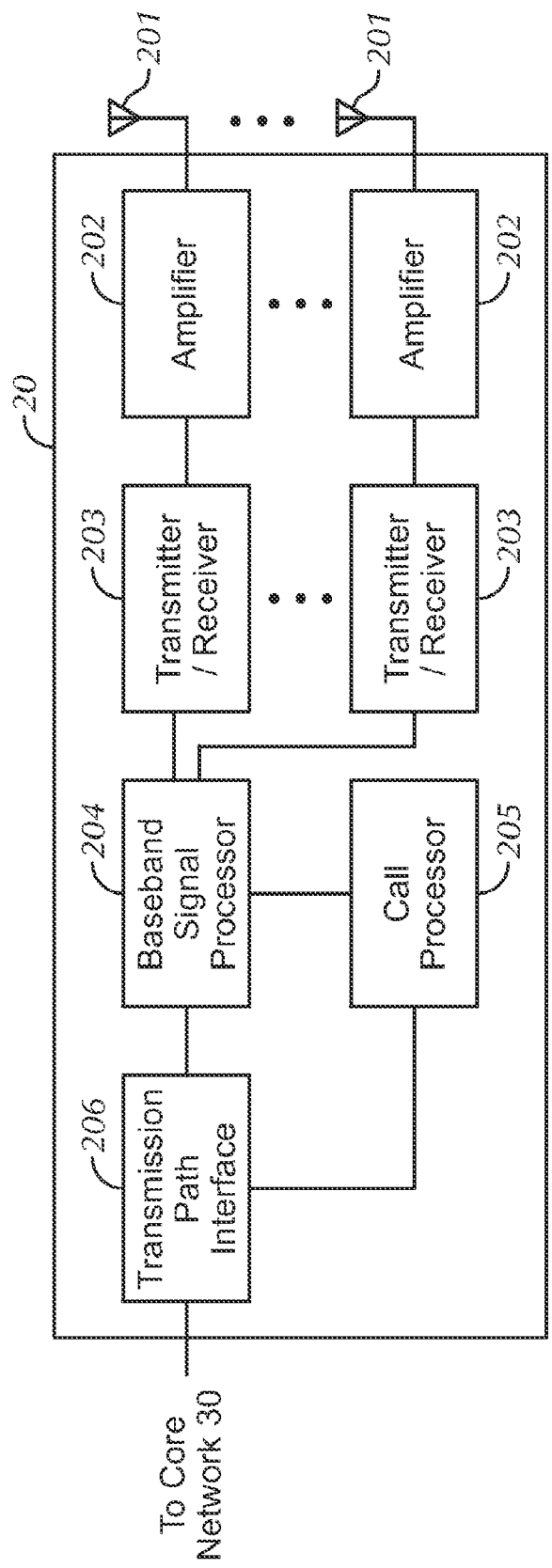
FIG. 15 is a diagram showing a schematic configuration of a BS according to embodiments.

FIG. 15 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.

Configuration of UE

Figure 16:
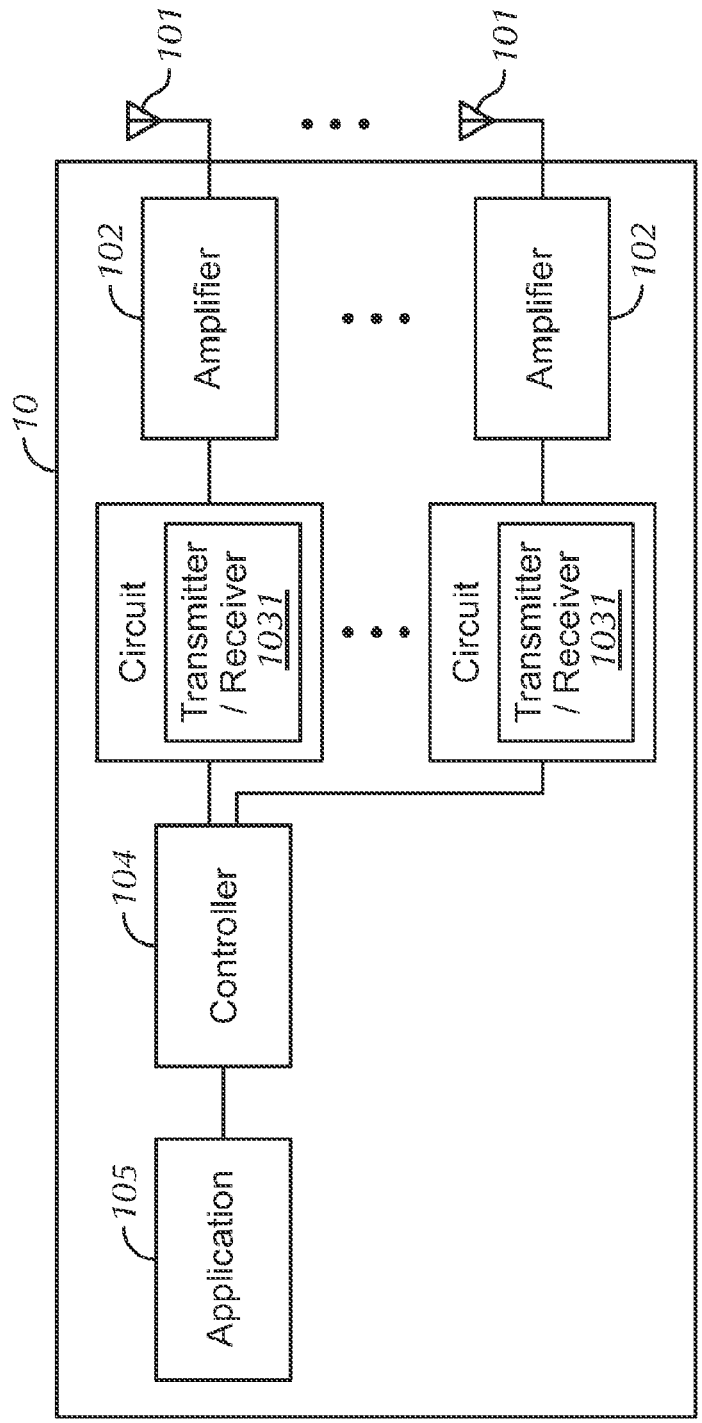
FIG. 16 is a diagram showing a schematic configuration of a UE according to embodiments.

The UE 10 according to embodiments of the present invention will be described below with reference to FIG. 16. FIG. 16 is a schematic configuration of the UE 10 according to embodiments of the present invention. The UE 10 has a plurality of UE antenna S101, amplifiers 102, the circuit 103 comprising transceiver (transmitter/receiver) 1031, the controller 104, and an application 105.

As for DL, radio frequency signals received in the UE antenna S101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Another Example

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of channel state information (CSI) reporting, the method comprising:
   determining, with a user equipment (UE), whether CSI to be reported includes a matrix based on network (NW) triggering; and
   performing, with the UE, CSI reporting based on the determination,
   wherein the CSI reporting is periodic, semi-persistent, or aperiodic CSI reporting, and
   wherein the NW triggering is implicitly performed based on a location of DCI detected by the UE.

2. The method according to claim 1, wherein the matrix is $W_{1,l}$.

3. The method according to claim 1, wherein the matrix is $W_{f,l}$.

4. The method according to claim 1, wherein the matrix reported includes both $W_{1,l}$ and $W_{f,l}$.

5. The method according to claim 1, wherein the NW triggering is explicitly performed using one or more downlink control information (DCI) bits.

6. A method of aperiodic channel state information (CSI) reporting, the method comprising:
   adding new states to a radio resource control (RRC) information element (IE) CSI-AperiodicTriggerStateList which captures whether to report a matrix; and
   determining, with a user equipment (UE), whether CSI to be reported includes the matrix based on network (NW) triggering,
   wherein the NW triggering is implicitly performed based on a location of DCI detected by the UE.

7. The method according to claim 6, wherein the matrix is $W_{1,l}$.

8. The method according to claim 6, wherein the matrix is $W_{f,l}$.

9. The method according to claim 6, wherein the matrix reported includes both $W_{1,l}$ and $W_{f,l}$.

10. The method according to claim 6, wherein additional reportQuantity is added to define new CSI-ReportConfig in order to configure a user equipment (UE) whether to report $W_{1,l}$.

11. The method according to claim 6, wherein a new field is added to an aperiodic TriggerState to determine whether to report $W_{1,l}$.

12. A user equipment (UE), comprising:
a processor that determines whether CSI to be reported includes a matrix based on network (NW) triggering; and
a transmitter coupled to the processor that performs CSI reporting based on the determination,
wherein the CSI reporting is periodic, semi-persistent, or aperiodic CSI reporting, and
wherein the NW triggering is implicitly performed based on a location of DCI detected by the UE.

13. The UE according to claim 12, wherein the matrix is $W_{1,l}$.

14. The UE according to claim 12, wherein the matrix is $W_{f,l}$.

15. The UE according to claim 12, wherein the matrix reported includes both $W_{1,l}$ and $W_{f,l}$.

16. The UE according to claim 12, wherein the NW triggering is explicitly performed using one or more downlink control information (DCI) bits.

* * * * *